United States Patent [19]

Terry et al.

[11] Patent Number: 4,738,222

[45] Date of Patent: Apr. 19, 1988

[54] ANIMAL TETHER

[76] Inventors: Jack M. Terry, P.O. Box 31, Hwy. 24; Michael D. Terry, P.O. Box 351, Hwy. 24, both of Torrey, Utah 84775; James M. Terry, 753 2200 Rd., Delta, Colo. 81416

[21] Appl. No.: 889,426

[22] Filed: Jul. 22, 1986

[51] Int. Cl.$^4$ .......................... A01K 3/00; A01K 1/04
[52] U.S. Cl. .................................................. 119/117
[58] Field of Search ............... 119/117, 120, 121, 122; 43/21.2

[56] References Cited

U.S. PATENT DOCUMENTS

| | | | |
|---|---|---|---|
| 2,295,581 | 9/1942 | Hyde | 119/117 |
| 2,507,383 | 5/1950 | Schiel et al. | 119/117 |
| 3,189,004 | 6/1965 | Sinclair | 119/124 |

FOREIGN PATENT DOCUMENTS 453621  9/1936  United Kingdom ................ 119/117

*Primary Examiner*—Robert P. Swiatek
*Attorney, Agent, or Firm*—Donald W. Erickson

[57] ABSTRACT

An animal tether comprising a base plate, a ground stake which extends through the base plate at about a 90° angel, the upper end of the ground stake projecting beyond the upper surface of the base plate and the lower end of the stake adapted to project into the ground for positive engagement with the ground, an upright tubular member which cooperatively slides over the upper end of the ground stake so as to freely rotate around the stake, the tubular member having a bend or curve of about 5° to 45° relative to the ground stake, a flexible rod, the lower end of which is secured into the upper end of the tubular member, the upper end of the flexible rod being fitted with a guide for receiving a tether line, and a tether line, one end of which is secured to the tubular member and the other end is threaded through the guide and secured to the animal.

13 Claims, 3 Drawing Sheets

ANIMAL TETHER

BACKGROUND OF THE INVENTION

Leash laws for the control of animals, especially dogs, have become common throughout the country in both urban and rural areas. Leash laws are encountered also at essentially all campgrounds and other recreational facilities. A frequent problem with prior art tethers is that the animal becomes entangled in the tether line which restricts the animal's movement and presents a danger of injury to the animal. An additional problem with prior art tethers is that the tether is cumbersome to set up and take down, which discourages the use thereof. Another problem of prior art tethers is that the tethers are frequently expensive to purchase which seriously limits the availability thereof. The present invention overcomes the foregoing problems of prior art tethers.

SUMMARY OF THE INVENTION

The present invention is directed at a novel animal tether which substantially eliminates tangling of the animal and tether line; but yet, allows the animal excellent freedom of movement over a 360° area. The tether of the present invention is strong, easy to install, portable, and inexpensive. In addition, the tether of the present invention has the advantage that the tethered animal feels little or no restriction in movement until it reaches the end of the 360° area.

The animal tether of the present invention comprises a base plate; a ground stake which extends through said base plate at about a 90° angle, the upper end of the ground stake projecting beyond the upper surface of the base plate and the lower end of the stake projecting into the ground; an upright tubular member which cooperatively slides over the upper end of the ground stake so as to freely rotate around the stake as the animal moves, said tubular member having a bend or curve of about 5° to 45° relative to the vertical plane of the ground stake, usually a curve of about 10° to 35°; a flexible rod, the lower end of which is secured to the upper end of the tubular member and the upper end of the rod having guide means for receiving a tether line; and a tether line, one end of which is secured to the tubular member and the other end of the line is threaded through said guide means and secured to attachment means on the animal.

DETAILED DESCRIPTION OF THE INVENTION

Figure 1:
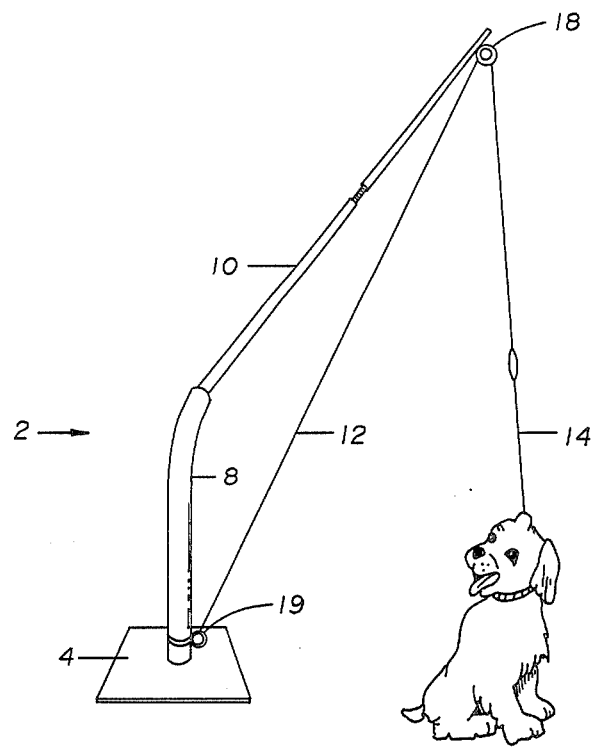
FIG. 1 is a perspective view of an animal tether of the present invention.
Figure 2:
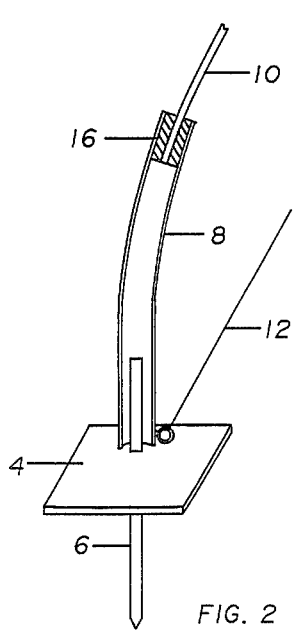
FIG. 2 is a cross sectional view of the lower end of the tether shown in FIG. 1.

Referring to FIGS. 1 and 2 of the drawings, there is shown an animal tether of the present invention comprising a base plate 4, a ground stake 6, a tubular member 8, a flexible rod 10, and a tether line 12, one end of which is secured to the tubular member and the other end of which is secured to attachment means, a leash 14 as shown, on a dog.

Figure 6:
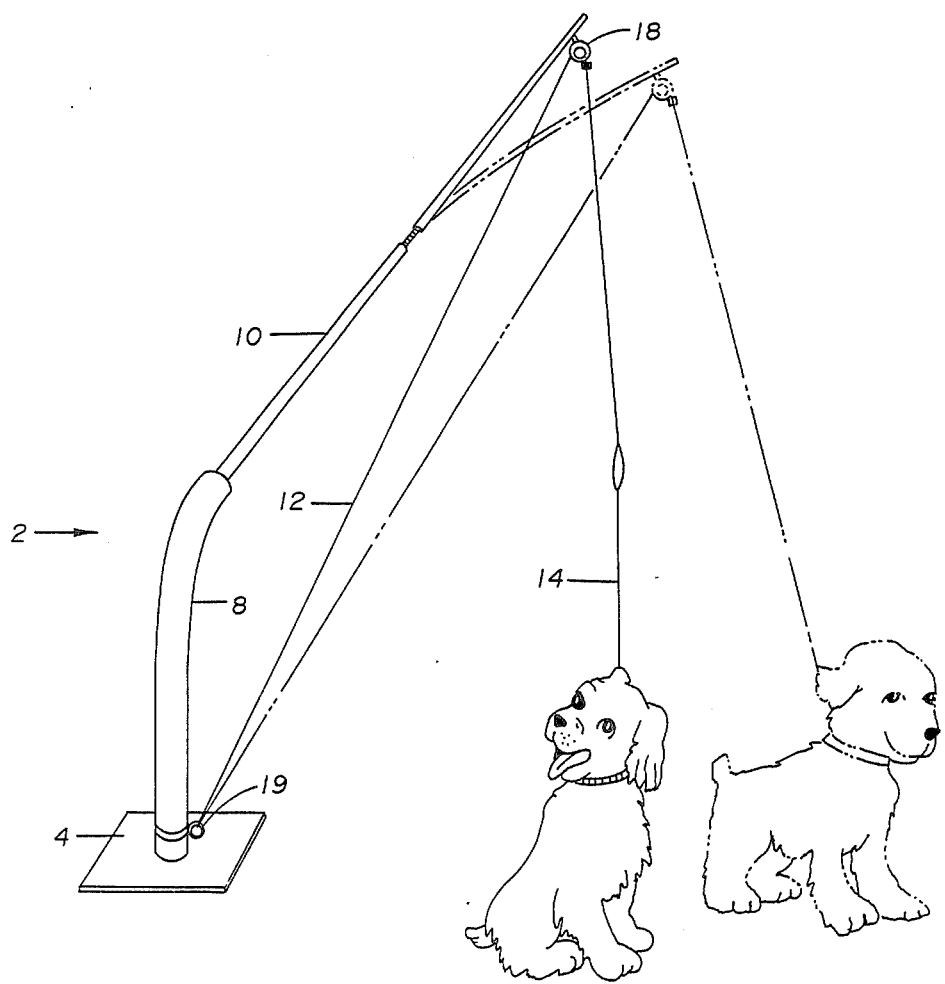
FIG. 6 shows the various positions of the tether rod and line of FIG. 1 as the animal moves out from the base of the tether.

For the purpose of a detailed description of the invention, the following description relates to a tether found to be effective and useful for tethering a medium size dog. As shown in the embodiment of FIGS. 1, 2, and 6, a base plate 4 is provided through which the ground stake 6 passes at a substantially 90° angle. The base palae which can be made of a reasonably heavy gauge, e.g. 10 or 12 guage steel or a tough plastic such as polyurethane, polybutylene, ABS, and the like, can be most any shape, i.e., circular, triangular, rectangular or essentially square as shown. In the embodiment shown, the base plate has a surface area of about 30 inches. A vertical ground stake 6, metal or plastic, passes through the center of the base plate, projecting into the ground about 6 inches or more. The upper end of the stake projects beyond the upper surface of the base plate about equidistant or longer than the lower end. A steel stake having a diameter of three-fourths inches and a length of 16 inches has proven effective. The tubular member 8 slides over the stake and freely rotates around the stake so that the dog has a full 360° area in which to move. A steel tubular member having an O.D. of one inch, a length of about 16 inches, and a curve or bend at the upper end of about 5 to 10 degrees has proven satisfactory. As shown in the drawings, the bottom of the tubular member is resting on the base plate. It should be recognized that the tubular member need not rest on the plate, but rather can be of a shorter length so long as it positively engages with and rotates around the ground stake. Into the curved upper end of the tubular member is slidably fitted a flexible rod 10. The rod can be made of plastic, such as fiberglass, having good flexural stiffness, or a metal, such as a good quality steel. A solid fiberglass rod with an O. D. of one-fourth inch and length of about 52 inches is satisfactory. As shown, the rod 10 is seated into the tubular member 8 using a resilient plastic plug or bushing 16 to provide positive seating thereof. For ease of portability and storage, the rod as shown in FIG. 1 is made of two pieces. The rod can be a single unitary piece or a telescopic rod also. The upper end of the rod is provided with guide means for receiving a tether line 12. In the embodiment shown, said means is a small swivel pulley 18 securely attached to the upper end of the rod. Other suitable means such as a ferrule secured to the rod tip can be used for guiding and receiving the tether line. The tether line 12 is secured at one end to the tubular member 8 as, for example, by eye bolt 19 and the other end is threaded through the swivel pulley 18 and then attached to the dog leash 14. A good quality nylon or polyester line is satisfactory or preferably a lightweight woven steel line. In this described embodiment for a medium size dog, a line about 9 feet long has proven satisfactory. The outer end of the line can be provided with a swivel clip for ease of attachment to and release from the dog's leash or collar. As shown in FIG. 1, one end of the tether line is secured very nearly to the extreme lower end of the tubular member. Without any intention of being bound by theory, it is believed to be critical to the strength of the tether to secure the tether line, as shown, near the lower end of the tubular member or at some point below where the bend or curve begins in the tubular member. The tether of the present invention has proven to be surprisingly strong; but yet, is very easy to set up and take down in a matter of minutes with no special tools required.

While the foregoing detailed description has been directed at a tether for a medium size dog, the tether of the present invention is readily adaptable by a change of dimensions, for dogs ranging from a small poodle to a large St. Bernard. The tether of the present invention, in addition to dogs, can be used for tethering other small animals such as cats, calves, goats and sheep.

Figure 3:
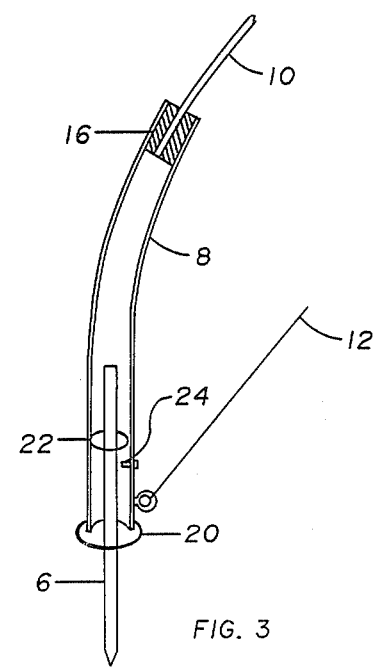
FIG. 3 is a cross sectional view of another embodiment wherein the ground stake and base plate are a single unit.

Referring to FIG. 3, there is shown another embodiment of the ground stake. In this embodiment, the ground stake 6 is integrally provided with a lower ring 20 and an upper ring 22. The lower ring serves the function of the base plate. The upper ring 22 in conjunction with retention means 24, such as a bolt or screw through the wall of the tubular member, provides a stopping mechanism as added insurance that a very sudden and strong pull by the tethered animal will not cause tubular member 8 to slide off the ground stake. The retention means 24 should not engage the stake so as to inhibit free rotation of the tubular member.

Figure 4:
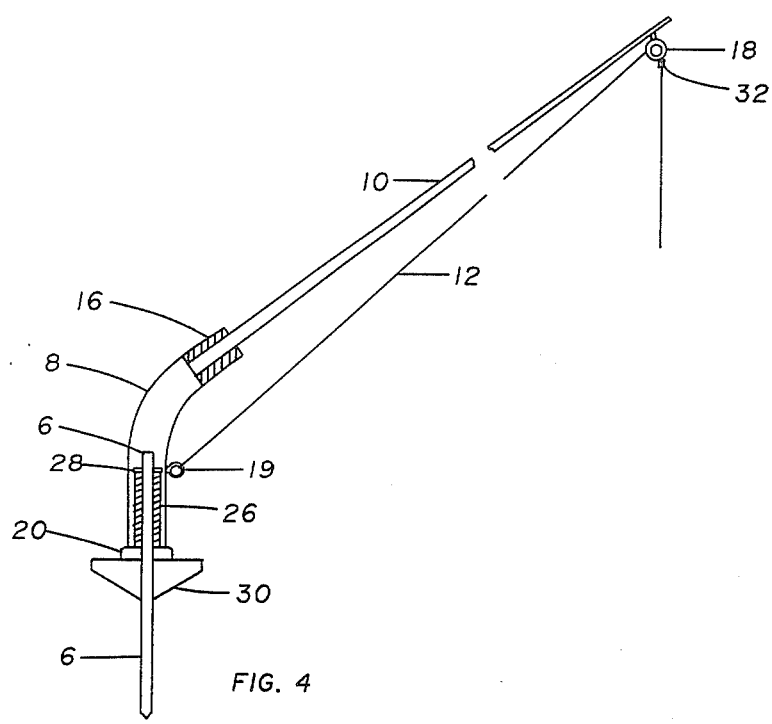
FIG. 4 is a cross sectional view of another embodiment of an animal tether of the present invention.
Figure 5:
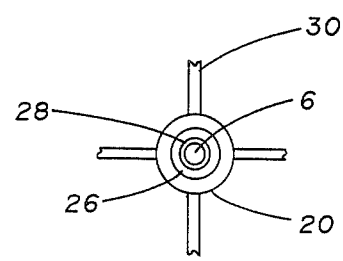
FIG. 5 is a top view of the ground stake used in the embodiment of FIG. 4.

Referring to FIGS. 4 and 5, there is shown another embodiment of the animal tether of the present invention. In this embodiment, the ground stake is provided with angular blades 30, suitably 2, 3, or 4 blades, as shown in FIG. 5. The blades provide excellent stability for the ground stake. The ground stake 6 is provided with a solid ring 20 on which the lower end of the tubular member 8 rests. The upper end of the ground stake is provided with a bushing 26 over which the tubular member 8 is slidably engaged and around which the tubular member positively but smoothly rotates according to the tethered animal's movement. The bushing, which may be plastic or metal, is held in place by a threaded nut 28 or other securing means such as a cotter pin or a ring. In this embodiment the curve or bend in the tubular member is at about mid-point of the length of the tubular member and the curvature is more acute than shown in the embodiment of FIG. 1. The purpose of the greater curvature is to keep the tether line 12 more or less parallel with the rod 10. The result of this design is that the risk of entanglement by the animal accidentally passing through the space between the tether line and rod is considerably minimized. This risk is further reduced by the provision of a stop 32 on the tether line. The stop 32, which may be a small clamp, keeps the tether line taut along the rod between securing means 19 and quide means 18. In another embodiment, not shown, the rod 10 is provided with a ferrule at about mid-point of the length of the rod. The ferrule serves to reduce slack in the tether line along the rod.

Referring to FIG. 6, positions of the tether rod and line are shown as the dog progressively moves out to the end of the 360° area. Once the dog becomes familiar with the outer radius of the line, it stays within its bounds and feels at ease.

In the event the animal owner wishes to use the tether of the present invention in a permanent or semi-permanent position, it is within the scope of the present invention to modify the ground stake and base plate so that it is installed by other than simply driving the stake into the ground as described above. For example, the tether can be mounted on the side or top of a dog house by use of a bracket with appropriate modification of of the stake such as shortening the lower end, if necessary. The base plate in such case may or may not be needed depending on the particular mounting surface. This method very dramatically reduces the risk of entanglement of the animal even though used in conjunction with a structure such as a dog house.

What is claimed is:

1. An animal tether which comprises:
   a base plate;
   a ground stake which extends through the base plate at about a 90° angle, the upper end of the ground stake projecting beyond the upper surface of the base plate and the lower end of the stake projecting into the ground for positive engagement therewith;
   an upright tubular member which cooperatively slides over the upper end of the ground stake so as to freely rotate around the stake, said tubular member having a bend of about 5 to 45 degrees relative to the vertical plane of the stake;
   a flexible rod, the lower end of which is secured into the upper end of the tubular member, the upper end of the flexible rod being fitted with guide means for receiving a tether line; and
   a tether line, one end of which is secured to the tubular member, and the other end is threaded through said guide means and secured to attachment means on the tethered animal.

2. The tether according to claim 1 wherein the bend in the tubular member is in the upper end of said member.

3. The tether according to claim 1 wherein the tether line is secured to the lower end of the tubular member.

4. The tether according to claim 1 wherein the bend in the tubular mechanism is in the upper end of said member and the tether line is secured to the lower end of said member.

5. The tether according to claim 4 wherein the bend in the tubular member is about 5 to 15 degrees relative to the vertical plane of the stake.

6. The tether according to claim 1 wherein said base plate and ground stake are a single unitary component.

7. The tether according to claim 6 wherein said ground stake has spaced apart concentric upper and lower rings as an integral part thereof and said tubular member has retention means in conjunction with said upper ring to prevent removal of said tubular member from said stake but which does not inhibit free rotation of the tubular member.

8. The tether according to claim 1 wherein the tubular member has a bend of about 10° to 35°.

9. The tether according to claim 1 wherein the tubular member has a bend of about 10° to 35° and said bend is at about midpoint of the tubular member.

10. The tether according to claim 1 wherein the ground stake is provided with a plurality of blades for engagement with the ground.

11. The tether according to claim 1 wherein said base plate and ground stake are a single unitary unit and said ground stake is provided with a bushing which cooperatively engages said tubular member for free movement of the tubular member as the animal moves.

12. The tether according to claim 1 wherein the bend in the tubular member is in the lower half of said tubular member.

13. The tether according to claim 1 wherein the tubular member has a bend of about 10° to 35° at about midpoint of the member, said base plate and ground stake are a single unitary component, said stake is provided with a plurality of blades for engagement with the ground, and said stake is provided with a bushing at its upper end which cooperatively engages the lower end of said tubular member for free rotation of the tubular member around the stake as the animal moves.

* * * * *